(12) United States Patent
Moller et al.

(10) Patent No.: US 9,616,429 B2
(45) Date of Patent: Apr. 11, 2017

(54) CONTROL AND POSITIONING SYSTEM FOR THE EXCHANGE OF WEAR LINING ELEMENTS ON A WALL SUBJECT TO WEAR

(75) Inventors: Tage Moller, Skelleftea (SE); Lars Furtenbach, Skelleftea (SE); Dennis Johansson, Skelleftea (SE)

(73) Assignee: Metso Minerals (Sweden) AB, Trelleborg (SE)

( * ) Notice: Subject to any disclaimer, the term of this patent is extended or adjusted under 35 U.S.C. 154(b) by 394 days.

(21) Appl. No.: 14/343,424

(22) PCT Filed: Sep. 5, 2012

(86) PCT No.: PCT/SE2012/050941
§ 371 (c)(1),
(2), (4) Date: Mar. 7, 2014

(87) PCT Pub. No.: WO2013/036194
PCT Pub. Date: Mar. 14, 2013

(65) Prior Publication Data
US 2014/0224907 A1    Aug. 14, 2014

(30) Foreign Application Priority Data
Sep. 8, 2011    (SE) ...................... 1150805

(51) Int. Cl.
*B02C 25/00*    (2006.01)
*B02C 17/22*    (2006.01)
*G01B 11/27*    (2006.01)

(52) U.S. Cl.
CPC .............. *B02C 25/00* (2013.01); *B02C 17/22* (2013.01); *G01B 11/27* (2013.01); *B02C 2210/02* (2013.01)

(58) Field of Classification Search
CPC ..... B02C 25/00; B02C 17/22; B02C 2210/02; G01B 11/27
(Continued)

(56) References Cited

U.S. PATENT DOCUMENTS

| 3,752,338 A | 8/1973 | Bartell |
| 5,148,591 A | 9/1992 | Pryor |

(Continued)

FOREIGN PATENT DOCUMENTS

| EP | 2 199 719 A2 | 6/2010 |
| SU | 1085625 | 4/1984 |
| SU | 1678449 | 9/1991 |

OTHER PUBLICATIONS

International Search Report dated Nov. 27, 2012.
(Continued)

*Primary Examiner* — Mark Rosenbaum
(74) *Attorney, Agent, or Firm* — Andrus Intellectual Property Law, LLP

(57) ABSTRACT

The invention concerns a control and positioning system for the indication of the mounting position of an exchangeable wear lining element at a surface at a wall that is subject to wear, which may be constituted by, for example, the inner surface of a rotating drum at an ore grinder. The wear lining element is supported at the free end of a maneuverable arm that is a component of a lifting arrangement that is controlled during the handling of the wear lining element during a mounting operation by a crane operator. The wall is provided with a set of mounting holes and the wear lining element is equipped on its lower surface with a set of attachment means. The wear lining element is intended to be tightened against the surface by means of supplementary attachment means that are introduced through the mounting holes.

10 Claims, 6 Drawing Sheets

(58) Field of Classification Search
USPC ............. 29/407.04, 407.09, 407.1, 720, 721; 241/30, 182, 183
See application file for complete search history.

(56) References Cited

U.S. PATENT DOCUMENTS

| | | |
|---|---|---|
| 5,978,094 A | 11/1999 | Narabe et al. |
| 6,082,646 A | 7/2000 | Clarke et al. |
| 2003/0189705 A1 | 10/2003 | Pardo |
| 2011/0134225 A1 | 6/2011 | Saint-Pierre et al. |

OTHER PUBLICATIONS

Written Opinion of the ISA dated Nov. 27, 2012.
Extended European Search Search Report for Application No. 12830184.3 mailed Apr. 28, 2015.
Decision on Grant for Russian Patent Application No. 2014113561/13(021187) dated Sep. 13, 2016.
Patent Examination Report No. 1 for Australian Patent Application No. 2015201044 issued Mar. 23, 2016.
Search Report for Chilean Patent Application No. 2014-000555 dated May 20, 2016.

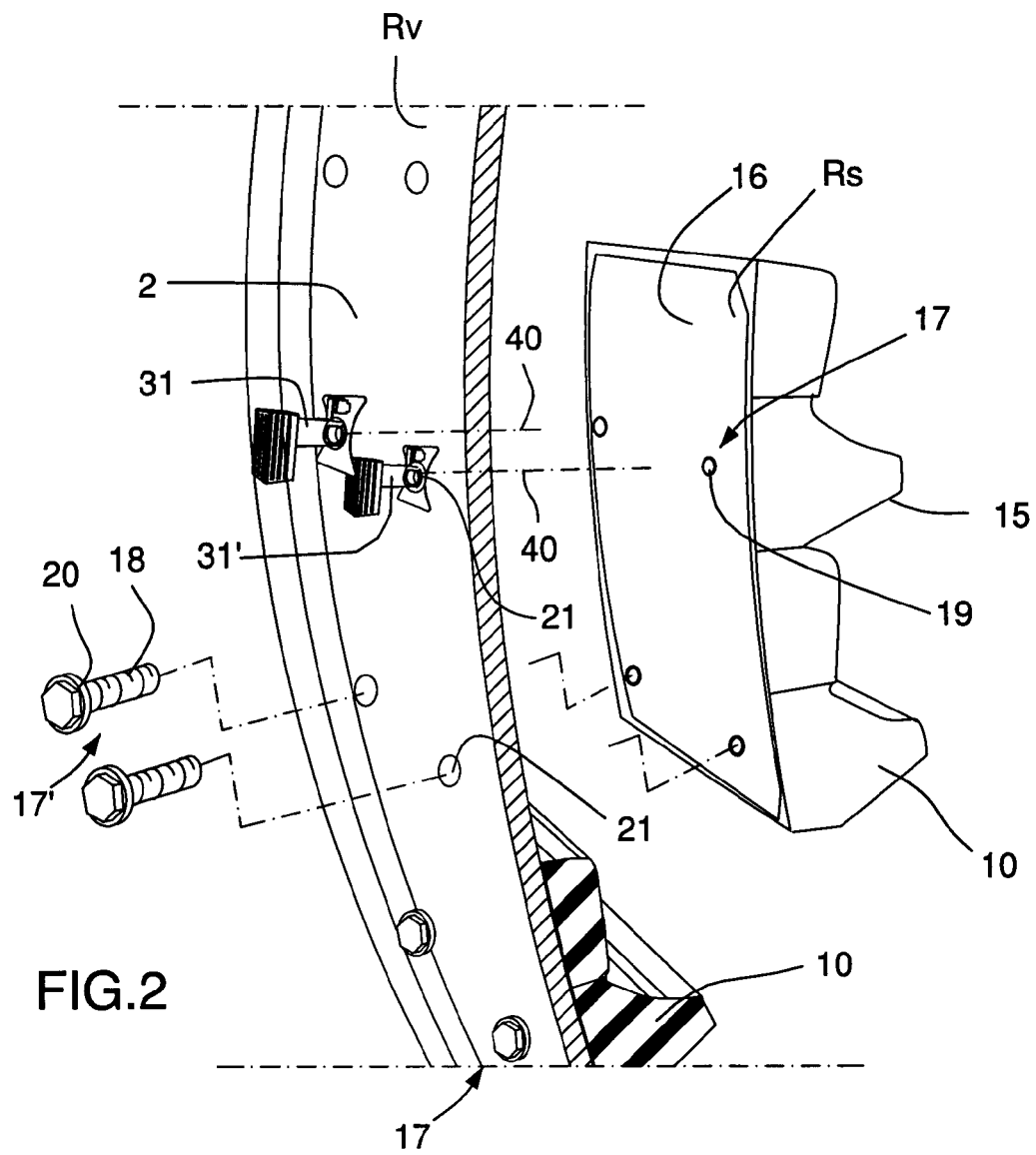
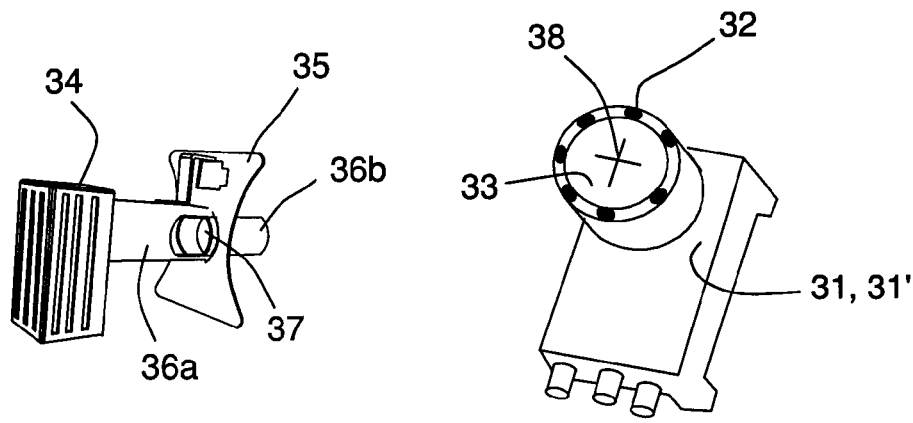
FIG.2
FIG.3
FIG.4

CONTROL AND POSITIONING SYSTEM FOR THE EXCHANGE OF WEAR LINING ELEMENTS ON A WALL SUBJECT TO WEAR

CROSS-REFERENCE TO RELATED APPLICATIONS

This application claims priority to PCT/SE2012/050941, filed Sep. 5, 2012, and published in English on Mar. 14, 2013 as publication number WO 2013/036194, which claims priority to SE Application No. 1150805-8, filed Sep. 8, 2011, incorporated herein by reference.

The present invention concerns a control and positioning system for the indication of the relative position between an exchangeable wear lining element and a predetermined mounting position on a surface formed on the inner surface of a wall subject to wear, for example in equipment that handles crushed ore or stone material according to the introduction to claim 1. In an alternative design, the invention makes it possible to carry out also such an exchange of wear lining through remote control and two-way communication over the internet.

A wall that is subject to wear, such as the jacket of a grinding drum that is used during the crushing and enrichment of ore, is covered on the inner surface that is subject to wear with a wear lining of, for example, elastomeric material. This wear lining is normally anchored by screw attachment against a surface of the cylindrical jacket sheet metal that forms the rotating drum of the grinder. The wear lining of the grinding drum is formed from a number of wear lining elements laid next to each other in sections, which elements are attached to the inner surface of the drum with the aid of attachment means in the form of, for example, bolts that pass through mounting holes arranged in the jacket sheet metal of the drum. Since the wear lining elements are placed in position against the side of the jacket wall that is subject to wear, but are mounted through attachment holes from the opposite side of the jacket surface, what is known as the "tensioning surface", significant problems arise during the adaptation of each individual wear lining element such that the attachment means of the wear lining element, which in its simplest form may include trivial attachment holes in the wear lining element, are located centrally relative to each attachment hole in the jacket before the wear lining element is lowered into place. The wear lining elements are very heavy and require lifting aids such as the arms of cranes, manipulators, or similar, for the handling of the wear lining elements inside the drum. Grinding drums of this type are normally in operation 24 hours a day, and this means that the lining is subject to very heavy wear and must be exchanged relatively frequently. When replacing the lining, the lining elements are lifted into the drum from one end and placed against a support surface on the inner surface of the jacket. Even if the crane operator is skilled, the adaptation itself of the wear lining elements onto the jacket surface is time-consuming and dangerous work, particularly if the wear lining elements are of the type that uses what are known as "drop-through bolts" and nuts. Exchanging drum lining is, furthermore, expensive due to the fact that it normally involves long interruptions of the production.

Various types of lifting and handling equipment, such as lifting cranes, intended to facilitate the exchange of drum linings are known. Such handling equipment normally comprises a lifting arrangement, such as an arm or a lifting crane, that can be manoeuvred inside the grinding drum and that is provided at its free end with a grip arrangement with which a wear lining element can be gripped and supported in a retaining manner. With the aid of the lifting crane, the grip arrangement and thus the lining element can be displaced essentially freely in space or with at least two or three degrees of translational freedom in space, i.e. in the x-, y- and z-directions, and with the aid of a number of rotational degrees of freedom also its attitude can normally be controlled, for example the roll, pitch and yaw angles of the grip arrangement. This can be described as a first angle $\alpha$, which is defined in the xy-plane, a second angle $\beta$, which is defined in the yz-plane, and a third angle $\gamma$, which is defined in the xz-plane. The number of degrees of freedom of the manoeuvrable arm may vary, depending on the specific design of the lifting arrangement. The manoeuvring of the lifting arrangement normally takes place with an operator who accompanies the lifting arrangement or who is present in its immediate vicinity and who controls it with a control unit.

As has been mentioned above, one of the major problems when exchanging drum linings is the difficulty of positioning and adapting each individual wear lining element such that its attachment means are located in the centre of the attachment holes that are arranged in the drum wall before the wear lining element can be lowered into place and the attachment elements applied such that the attachment of the wear lining can be made possible with the aid of supplementary attachment means. The said supplementary attachment means is normally constituted by a system of bolted joints whereby the wear lining element is placed under tension against the inner surface of the grinding drum through screws being introduced through existing attachment holes in the elements and onwards out of the mounting holes in the grinding drum, whereby the screws are held in place by means of nuts on the outer surface (the tensioning surface) of the grinding drum. In SE 531 347 C2, however, a new mounting technology is described in which the wear lining elements are equipped with threaded holes with associated guide pegs. Thus, nuts are not required. Attachment is achieved by means of bolts (such as screws) that are introduced through mounting holes from the outer surface of the grinding drum (the tensioning surface). During mounting of wear lining elements, it is generally the case that the crane operator, by radio or similar, is in wireless connection with personnel who are in the close vicinity of the intended mounting location of the wear lining element or a support surface on the wall. The crane operator receives commands and information about how the wear lining element is to be oriented in order for the mounting holes of the wear lining element to be located in line with and central to the mounting holes of the wall. In order to provide the information required to make it possible for the crane operator to bring together the supplementary attachment means in the mounting holes of the wear lining element, the personnel must be present dangerously close to the mounting location and, in certain cases, under the wear lining element that is suspended from the crane arm. It should be realised that this operation is highly risky, not least because the wear lining sections that are being exchanged are normally very heavy.

A first purpose of the present invention is to achieve a control and positioning system that solves the problems described above and that makes it possible to carry out, in a manner that is safer for the personnel and more efficient, the exchange of worn drum linings on walls that are subject to wear, in particular for rotating drum mills. What is particularly aspired to is to achieve a control and positioning system that ensures that personnel do not have to work under a crane arm from which lining sections are suspended, as has been described above. This is achieved through a control and positioning system that demonstrates the features and characteristics that are specified in claim 1.

A second purpose of the present invention is to achieve a system that makes it possible to carry out renovation and exchange of wear linings without it being necessary for the crane operator to be present at the site of the lining operation.

Due to a two-dimensional sensor being arranged at the outer surface of the wall, i.e. on the opposite side of the wall seen from the wear of the mounting surface, in such a manner that the field of view of the sensor contains the lower side of the wear lining element viewed through the mounting holes, and due to the sensor being arranged to emit an electrical signal that represents an image of the relative position between a first reference system Rv that is constituted by the mounting holes of the wall and a second reference system that is constituted by the attachment means located on the lower surface of the wear lining element, which may, of course, include also trivial mounting holes, it is possible for the mounting position of the wear lining element to be determined in a simple and efficient manner, and thus for the wear lining element to be guided to its mounting location on the wall.

It is appropriate that the two-dimensional sensor comprise two imaging cameras that are arranged stationary relative to the first reference system Rv such that the lines of sight from the outer surface of the drum jacket of these sensors pass through the mounting holes of the grinding drum. An image processing unit is a component of the system, which unit converts the signal to a two-dimensional or three-dimensional representation and a display unit with which the positional information can be presented to the crane operator in real time such that the crane operator can guide and manoeuvre the lifting arrangement and in this way bring the wear lining element into its mounting position against the wall. The crane operator can in this way see the "field of view of the camera" and in this way through reception of information in real time can view the lower surface of the wear lining element on the monitor through the use of the direct information from the display unit in order to position accurately the wear lining element in its place against the support surface of the inner surface of the grinding drum such that the attachment means that are present on the lower surface of the wear lining element are located centrally in a relevant mounting hole in the wall.

In an alternative design, it is conceivable that the actual guidance or positioning procedure can take place automatically, based on the information that is received from the image processing unit of the system, whereby critical operations during the exchange of wear linings can be automated. When the crane operator is satisfied with the position, the positioning function is activated by pressing a button at the control unit. The camera then captures an image of a cross on a panel and calculates the position of its centre and its distance with the aid of a laser beam, whereby a microprocessor calculates, in a manner that is known, the data required and guides the lifting arrangement, and thus also the wear lining element, into place. In another design, it is conceivable that information concerning the positions of the attachment means relative to the mounting holes, as a supplement to the purely visual information that a crane operator receives from images in a monitor, may be tactile, or it may be audiovisual in which an image that is displayed on a monitor corresponds to the tactile or audiovisual information.

One of the major advantages of the present control and positioning system is that alignment of the wear lining element with the mounting holes of the support surface is considerably facilitated and, in particular, through it not being necessary for personnel to be present in the immediate vicinity of the wear lining element during the actual work of alignment and positioning. All positioning can take place with high accuracy at a safe distance from the site of mounting. As an alternative, it would be possible for a crane operator to work using remote control and an external communication unit in a system in which data is transferred in two directions over, for example, the internet or a WLAN, whereby it is appropriate that one single experienced crane operator can control one or several lifting arrangements or manipulators for the handling of wear lining elements from a significantly remote location. The cost savings and the increase in efficiency that can be obtained in the latter case are obvious, since it is not necessary for an experienced crane operator to travel to the location, such as a mine, where, for example, an ore grinder is located, but can instead manoeuvre the lifting arrangement in a wireless manner from a distant terminal.

An embodiment of the invention will be described below in more detail with reference to attached drawings, of which:

FIG. 1 shows a cross-sectional view through a part of a typical grinder installation with a lifting arrangement arranged in this installation, which lifting arrangement, in order to position a wear lining element, wherein an operator uses a control and positioning system according to the present invention;

FIG. 2 shows an exploded view in perspective of a part of a grinding drum with the control and positioning system according to the invention during the positioning of a wear lining element against a support surface of the inner surface of the drum, that is subject to wear, and the mounting of the wear lining element with attachment bolts that, passing through the mounting holes in the jacket of the grinding drum, are intended to be mounted from the outer surface of the drum, i.e. the surface that is known as the "tensioning surface";

FIG. 3 shows a perspective view of a protective housing for an image recording camera and a source of illumination that is a component of the control and positioning system according to the invention;

FIG. 4 shows a perspective view of a digital image recording camera with its associated source of illumination in the form of LEDs, distributed around the camera lens and being components of a control and positioning system according to the invention;

Figure 9:
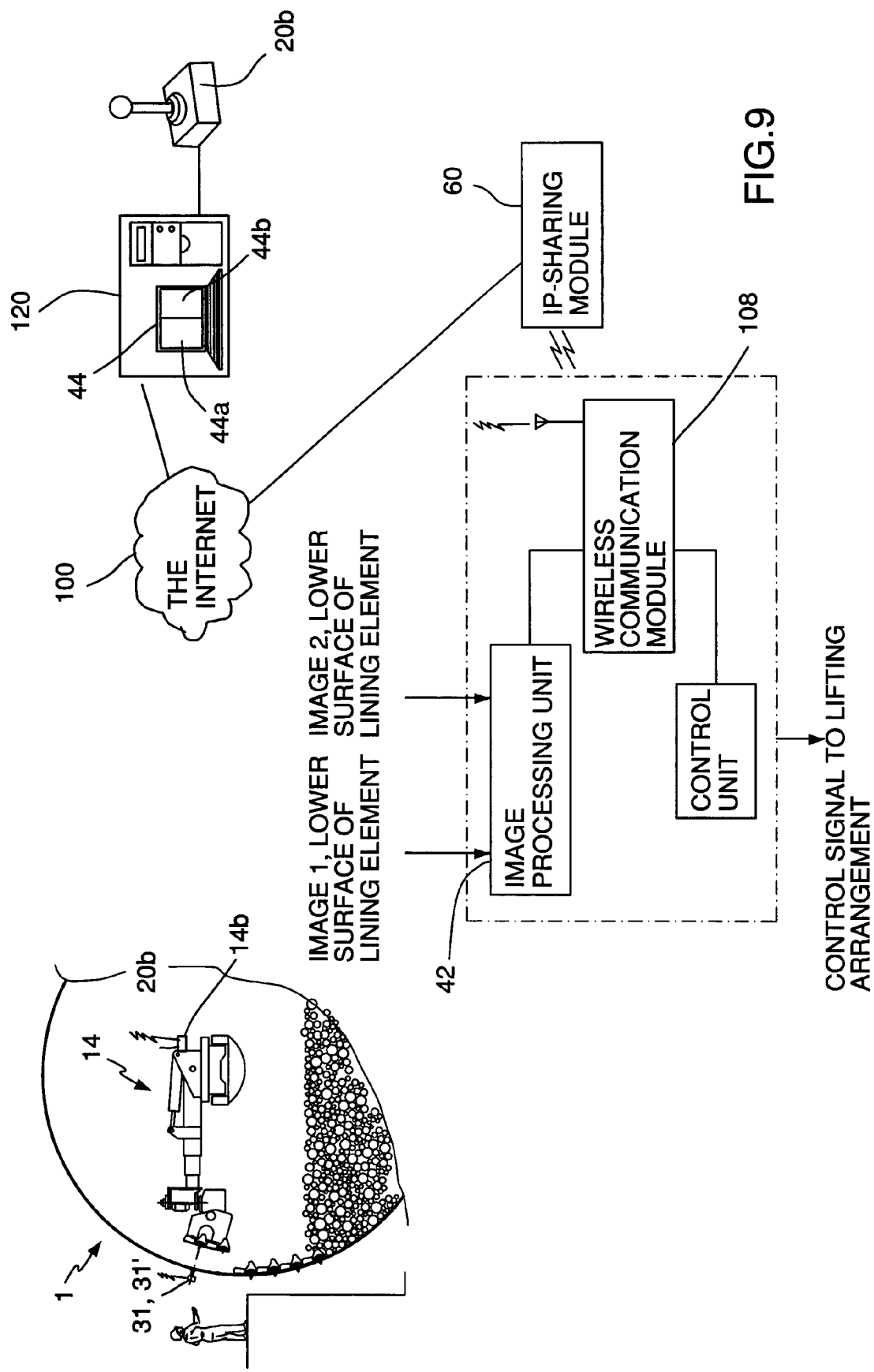

FIGS. 7a-7c show schematically in an example the mutually different angular positions that may arise between two mounting holes that are included in the fixed first reference system Rv that is defined by the jacket wall (the X/Y plane) of the grinding drum and two attachment means that are components of the moveable second reference system Rs that is defined by a wear lining element that is being handled by a lifting arrangement, whereby:

a) the two attachment means of the wear lining element are placed with their longitudinal axes perpendicular to the X/Y plane,
b) the two attachment means of the wear lining element are placed with their longitudinal axes at an angle of 25° to the X/Y plane, and
c) the two attachment means of the wear lining element are placed with their longitudinal axes at an angle of −25° to the X/Y plane;

FIGS. 8a-8c show schematically an example of how a graphical two-dimensional image may appear, i.e. sessions with a DualScreen structure that are presented to a crane operator via a monitor at different conditions of the angular position between two of the mounting holes of the jacket wall and two of the opposing attachment means of the wear lining element corresponding to FIGS. 7a-7c, whereby:
a) the attachment means lie centrally in the mounting holes, i.e. the attachment means are perpendicular to the X/Y plane
b) the attachment means are located obliquely at an angle to the mounting holes, i.e. the attachment means are at an angle of 25° to the X/Y plane
c) the attachment means are located obliquely at an angle to the mounting holes, i.e. the attachment means are at an angle of −25° to the X/Y plane;

FIG. 9 shows a system for the remote control operation of a crane arrangement that when carrying out the exchange of wear lining in a grinder uses geometrical information in order to assess the angular positions between the different reference systems Rv, Rs in a control and positioning system according to the present invention.

Figure 1:
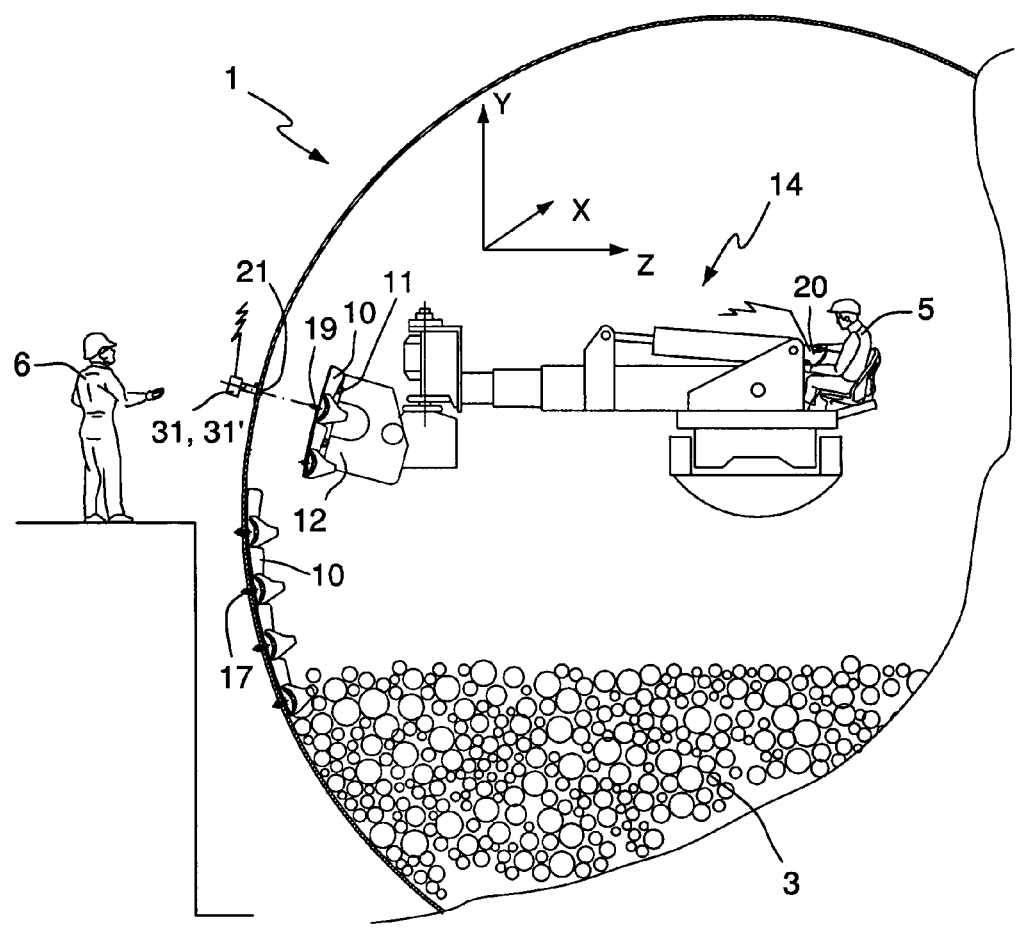

FIG. 1 shows a cross-section through a part of a typical grinding drum 1 with a surrounding wall in the form of a sheet metal jacket 2 that is subject to wear, which grinding drum is used during the crushing and milling of ore 3 in an ore grinder. A first operator 5, a crane operator, is located inside the drum while a second operator 6 is located outside of the drum. The two operators 5, 6 can communicate in a wireless manner with each other through, for example, a mobile telephone or radio link. An internal drum lining at a drum mill 1 of the said type is formed from a number of wear lining elements 10, known as "jacket plates", located next to each other. Each wear lining element 10 has lifting lugs 11 designed for interaction with a hooked gripper 12 that is located at the free end of a lifting arrangement 14 that has been introduced into the grinding drum 1. A wear lining element 10 demonstrates an upper surface 15 that faces in towards the centre of the grinding drum 1 manufactured from a material that resists wear such as, for example, wear rubber, and a lower surface 16 of metal attached by vulcanisation to the said wear rubber.

Since ore grinders of the type under consideration normally operate round-the-clock, the wear lining elements 10 must be exchanged at regular intervals. For this purpose, the wear lining elements 10 are equipped with attachment means general denoted by 17, which in the embodiment described here comprise threaded holes 19 with associated guide pegs that can be released. The reference number 17' is used generally to denote supplementary attachment means intended for the mounting, which means are constituted by what are known as "bolted joints" in the form of screws 18 provided with a head 20 and intended to be introduced from the outer surface of the drum jacket through mounting holes 21 in the sheet metal jacket 2 of the grinding drum 1, to be screwed in place in threaded holes 19 in the wear lining element. Thus, this attachment system is essentially of the type that is known from SE 531 347 C2.

In this part it should be understood that the expression "attachment means 17" is used to denote any known type of attachment means with which the wear lining element 10 may be equipped, i.e. not only threaded holes with the associated guide pegs of the type that is described in this embodiment and in the document mentioned above, but also more simple systems of screw-nut type, known as "drop-through bolts", whereby the wear lining elements are provided with simple mounting holes.

The wear lining elements 10 are positioned centrally with respect to the mounting holes 21 in the sheet metal jacket 2, after which they are tightened against a surface on the inner surface of the jacket by being screwed by means of the said screws 18 from the outer surface of the sheet metal jacket 2, i.e. from what is known as the "tensioning surface". This type of wear lining element 10 is very heavy and difficult to handle and, even if the crane operator, i.e. the first operator 5 in the drawing, is skilled, there are severe difficulties in positioning and adapting each individual wear lining element 10 such that the attachment means 17 on the lower surface of the wear lining element 10 are located centrally with respect to each attachment hole 21 before the wear lining element can be lowered into place and fixed from the outer surface of the drum by means of the supplementary attachment means 17' by the second operator 6 who works outside of the grinding drum 1.

A lifting arrangement 14 with a crane design is shown in FIG. 1 working inside the grinding drum 1. The gripper 12 that is arranged at the tip of the lifting arrangement 14 is in known manner equipped with pegs or hooks (not shown in the drawings) that can be inserted into the lifting lugs 11 of the wear lining element 10. When the said hooks have been introduced into the lifting lugs 12, a wear lining element 10 can be carried in a retaining manner by the lifting arrangement 14 and can in this manner be freely handled and positioned inside the grinder. The motion of the lifting arrangement 14 is controlled and monitored by means of control and actuator means 14a that are normally hydraulically operated, such as hydraulic cylinders, but may be constituted alternatively by electrical servomotors. The control of the control and actuator means of the lifting arrangement 14 takes place through a control unit 14b such as a control valve unit with fluid connectors and through the influence of a control unit 20 with control and guide sticks that the first operator 5 who works inside the grinding drum, travelling with the lifting arrangement as a driver, has in front of him or her at the driving location. The first operator 5, who works inside the grinding drum 1, thus travels with the lifting arrangement 14 and thus controls its various motions by means of the control unit 20. The control unit 20 is equipped with the required buttons and knobs that through their influence and setting cause the lifting arrangement 14 to carry out the desired motions. With the aid of the lifting arrangement 14, the lining element can be displaced essentially freely in space or with at least two or three degrees of translational freedom in space, i.e. in the x-, y- and z-directions, and with the aid of a number of rotational degrees of freedom also its attitude can normally be controlled, for example the roll, pitch and yaw angles of the grip arrangement. This can be described as a first angle α, which is defined in the xy-plane, a second angle β, which is defined in the yz-plane, and a third angle γ, which is defined in the xz-plane.

In order for it to be possible to exchange worn out drum linings in rotating drum mills 1 in a more efficient and safer manner, a control and positioning system 30 is, according to the present invention, arranged to work together with the lifting arrangement 14. The control and positioning system 30 facilitates in particular the control and positioning of the crane arrangement 14 in real time by the first operator 5 who is located inside the grinding drum 1 in such a manner that the wear lining element 10 is located in exactly the right place against the support surface in the inner surface of the sheet metal jacket 2. The expression "in place" is used below to denote the following: that the attachment means 17 of the wear lining element 10, which attachment means are equipped with an internal thread, are located essentially centrally relative to the relevant mounting hole 21 in the jacket sheet metal 2 such that, for attachment under tension of the wear lining element, the supplementary attachment means 17' in the form of the screws 18 can be introduced by being passed through the mounting hole 21 and screwed into the attachment means 17, in the form of threaded holes 19, of the wear lining element 10. The term "real time" is used to denote that the first operator 5 who is operating the lifting arrangement, receives essentially without any delay in time, i.e. instantaneously, information about the position of the wear lining element 10 relative to the intended mounting location on the support surface of the inner surface of the drum jacket.

FIG. 2 shows a control and positioning system 30 according to the present invention in more detail, whereby a first reference system Rv is defined by the mounting holes 21 of the drum jacket 2, and a second reference system Rs is formed by the attachment means 17 located on the lower surface of the wear lining element 10 in the form of holes 19 provided with internal threads. The control and positioning system 30 comprises further sighting means that, based on the two reference systems Rv, Rs, makes it easier for the crane operator 5 who is manoeuvring the lifting arrangement 14 to guide towards a determined mounting location on the inner surface of the sheet metal jacket. The sighting means of the control and positioning system comprises a two-dimensional sensor in the form of first and second image recording cameras 31, 31'. Each such image recording camera 31, 31' is of the type in which images are exposed on a digital image sensor and transferred as electrical signals representing a stream of still images or of image sequences of the relative position between the first and second reference systems Rv, Rs. A source of illumination is arranged at each image recording camera 31, 31' in the form of a source of light 32 with LEDs that are evenly distributed around a circle around the lens 33 of the image recording camera 31, 31' (FIG. 4).

FIG. 3 shows in more detail a camera housing 34 that can be opened, in which each of the said image recording cameras 31, 31' and its associated source of light 32 can be inserted and fixed. Attachment means 35 are present at the front end of the camera housing 34 in the form of a magnetic attachment with which the camera housing can be mounted in a manner that allows it to be removed on the outer surface of the jacket sheet metal 2 of the grinding drum 1 such that the two image recording cameras 31, 31' are fixed stationary relative to the first reference system Rv in the manner shown in FIG. 2. Between the camera housing 34 and the attachment means 35 that is located at the front end there extends an intermediate tubular part 36a, and a ring-shaped guide 36b protrudes a short distance forwards from the attachment means 35. The lens 33 of the image recording camera 31, 31' is intended to extend a short distance into the rear end of the tubular part 36a, whereby the said part forms a receiving compartment for the lens. The tubular guide 36b that protrudes forwards from the attachment means 35 has been given an external diameter that has been selected such that it can be adapted as a probe into a mounting hole 21 in the jacket sheet metal 2. The tubular guide 36 is attached at the camera housing 34 by means of a bayonet fitting or similar in a manner that allows it to be removed, whereby the camera housing can be simply be provided with tubular guides 36 with different external diameters in order for it to be possible to adapt these to drum jackets 2 with mounting holes of different internal diameters.

At the forward end of the tubular guide 36b of the camera housing 34 there is an opening 37 that, when the tubular guide has been inserted a certain distance into a mounting hole 21 in the jacket 2, not only allows images to be received and projected onto the digital image sensors of the image recording cameras 31, 31' that are inside the camera housing, but also allows light in the form of beams from the source of light 32 to stream out from the camera housing in order to illuminate the target, which is constituted by the lower surface of the wear lining element 10. While the two image recording cameras 31, 31' are fixed in position relative to the first reference system Rv (through the mounting holes 21) with a field of view that is constituted by the attachment means 17 located at the lower surface of the wear lining elements 10, the second reference system Rs of the system is obtained by suitable image processing of an electrical signal that represents an image of the said target, such as, for example, a two-dimensional image. This two-dimensional image makes it possible for the crane operator to interpret in real time the relative position between the two reference systems Rv, Rs, i.e. the relative position between the mounting holes 21 of the jacket sheet metal 2 and the attachment means 17 that are located at the lower surface of the wear lining element 10. Through the use of image rasterisation and different types of geometrical object forms that arise between the two reference systems Rv, Rs, i.e. comparisons of target values with actual values for projected surfaces, it is possible for a skilled crane operator to make conclusions about the relative positions of the two reference planes (their characteristics), and how the lifting arrangement is to be manoeuvred in order for the attachment means 17 of the wear lining element 10 and thus also the reference system Rs to be located centrally relative to the first reference system Rv. According to the invention, the relative position between the two reference systems Rv, Rs is determined in the presence of a flow of light that is produced by a source of light 32. It should be understood that other suitable sources of illumination such as laser light or IR light can be used in order to make the relative position between the two reference systems Rv, Rs visible in an image recording camera.

FIG. 4 shows an image recording camera 31, 31' in more detail, by which it is made clear that the lens 33 comprises cross-hairs 38 that form an origin in the centre of the mounting hole 21. Due to the source of light 32, the cross-hairs 38 form an illuminated reference point, the purpose of which will be described in more detail below. Each image recording camera 31, 31' and each source of light 32 is so arranged in the camera housing 34 that with the attachment means 35 mounted over one of the mounting holes 21 of the grinding drum, the image recording camera 31, 31' has its line of sight into the centre of the grinding drum, or—to put it another way—it "sees" in towards this centre. The source of light 32 projects in a similar manner a beam 40 through the mounting hole 21 that intersects the lower surface 16 of a wear lining element 10 that is being handled by means of the lifting arrangement 14 inside the grinding drum 1.

Figure 5:
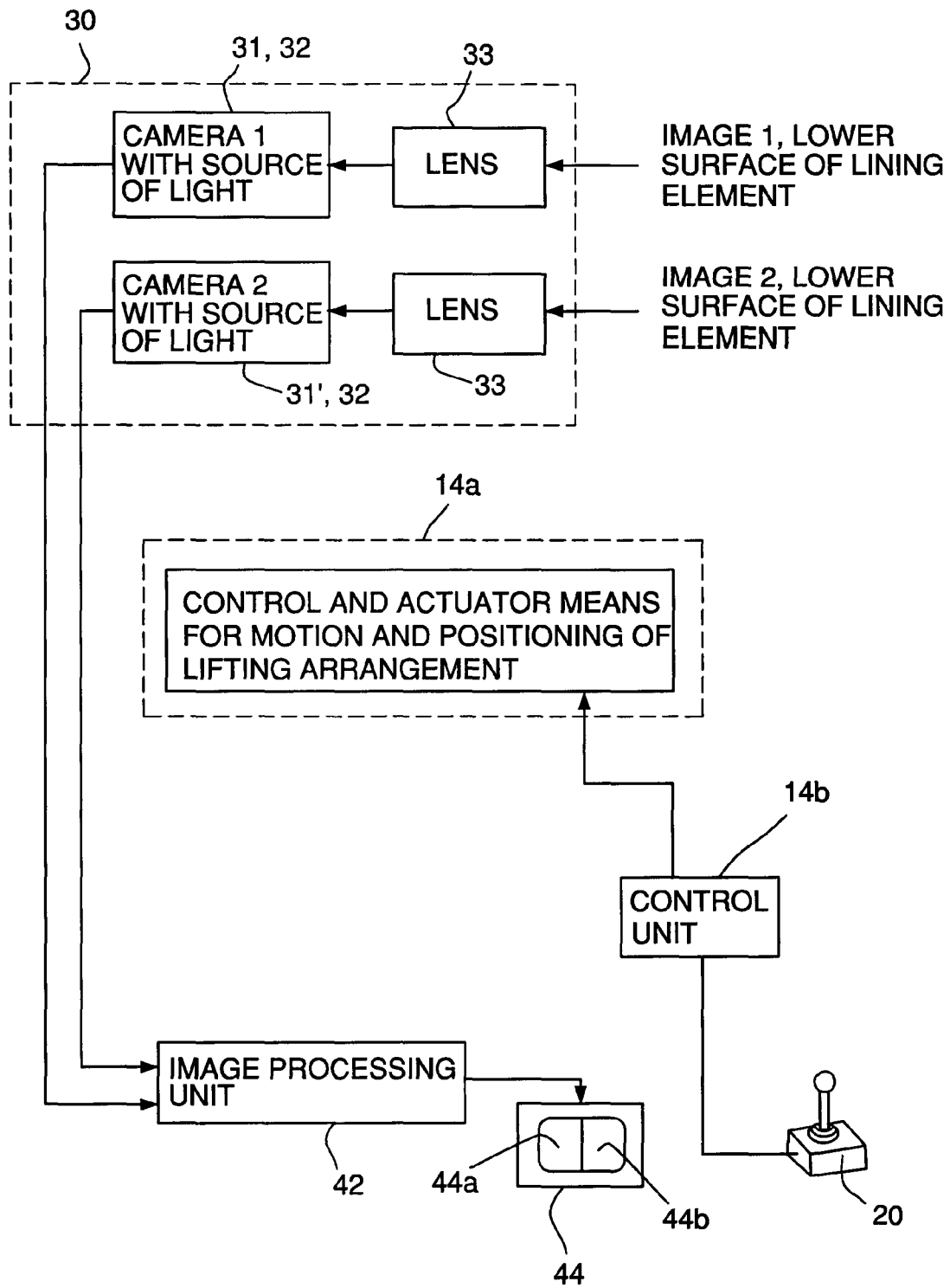
FIG. 5 shows a block diagram of a control and positioning system according to the present invention intended to be used at a lifting arrangement for the handling of wear lining elements in order to facilitate exchange of wear lining in a rotatable grinding drum.

FIG. 5 makes it clear in more detail that each image recording camera 31, 31' is connected through an image processing unit 42 to a monitor 44 that receives and projects image signals from the two image recording cameras 31, 31'. The communication between the said units can be achieved in any suitable manner, for example through networks and wireless communication links to one or several access points in the form of what are known as radio base stations, arranged within a mine area with a number of operating grinders. The image information can be transferred through the wireless connections via the internet or a WLAN over very long distances, even between different parts of the world, whereby it would be possible for one single experienced crane operator to control remotely from an operating location using external communication one or a number of lifting arrangements 14 or manipulators during the exchange of wear linings in mine facilities located far away. In the embodiment that is described here, the first operator 5, who works inside the grinding drum 1, travels with the lifting arrangement 14 and controls its various motions by means of the control unit 20. It is an advantage if the monitor 44 can be adapted to display for the operator 5 stereotactic images from each one of the two image recording cameras 31, 31' at the same time using what is known as a "split screen". Another way of saying this is that sessions are formed on a DualScreen with images 44a, 44b from the first and the second image recording cameras 31, 31', respectively. Since it is known that two reference points or reference data are required in order to guide an object to an exact position on a plane, i.e. on the plane that the support surface for a wear lining element 10 that the inner surface of the sheet metal jacket 2 of the grinding drum 1 forms, it should be realised that it is an advantage if both camera images 44a, 44b can be shown stereotactically on the monitor 44, i.e. in the manner that is illustrated in FIGS. 6a and 6b.

Figures 6A, 6B:
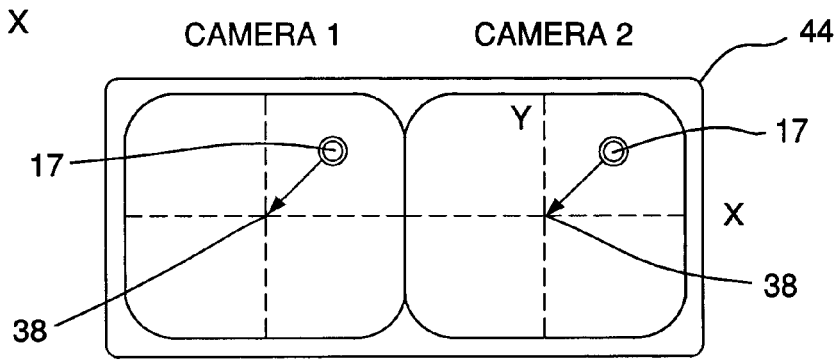
FIGS. 6a and 6b show computer images such as a crane operator sees them and divided into sessions using a DualScreen system in which each image has been created by a first and second image recording camera, respectively, that are components of a control and positioning system according to the invention.

The reference points are denoted in FIGS. 6a and 6b each with cross-hairs 38, while each target is denoted with attachment means 17. As a consequence of the stereotactic images that the monitor is conveying at any moment through the two camera images 44a, 44b (FIGS. 6a, 6b) that are obtained on the monitor 44 that is integrated into the control unit 20, the first operator 5 is able to rapidly localise the exact location at the sheet metal jacket 2 for the wear lining element 10 and the position in which the two reference systems Rv and Rs lie centrally relative to each other with their X/Y planes parallel. Another way of saying this is that the operator can localise the condition in which two of the attachment means 17 of the wear lining element 10 are located centrally relative to the relevant mounting holes 21 in the jacket 2 and in which the attachment means 17 of the wear lining element 10 are perpendicular to the X/Y plane. Thus the cross-hairs 44 form in the monitor 44 the reference system required by the first operator 5 who operates the crane. Though operating the levers and knobs of the control unit 20, the wear lining element 10, which is supported by the lifting arrangement 14, is positioned in place such that two of its attachment means 17 are located centrally relative to the relevant mounting hole 21 in the jacket sheet metal 2, after which the wear lining element is lowered into place. The second operator 6 tightens the wear lining element 10 against the inner surface of the grinding drum through screws 18 being introduced through the mounting holes 21 and being screwed into the attachment means 17 of the wear lining element from the outer surface (the tensioning surface) of the grinding drum 1.

Figure 7:
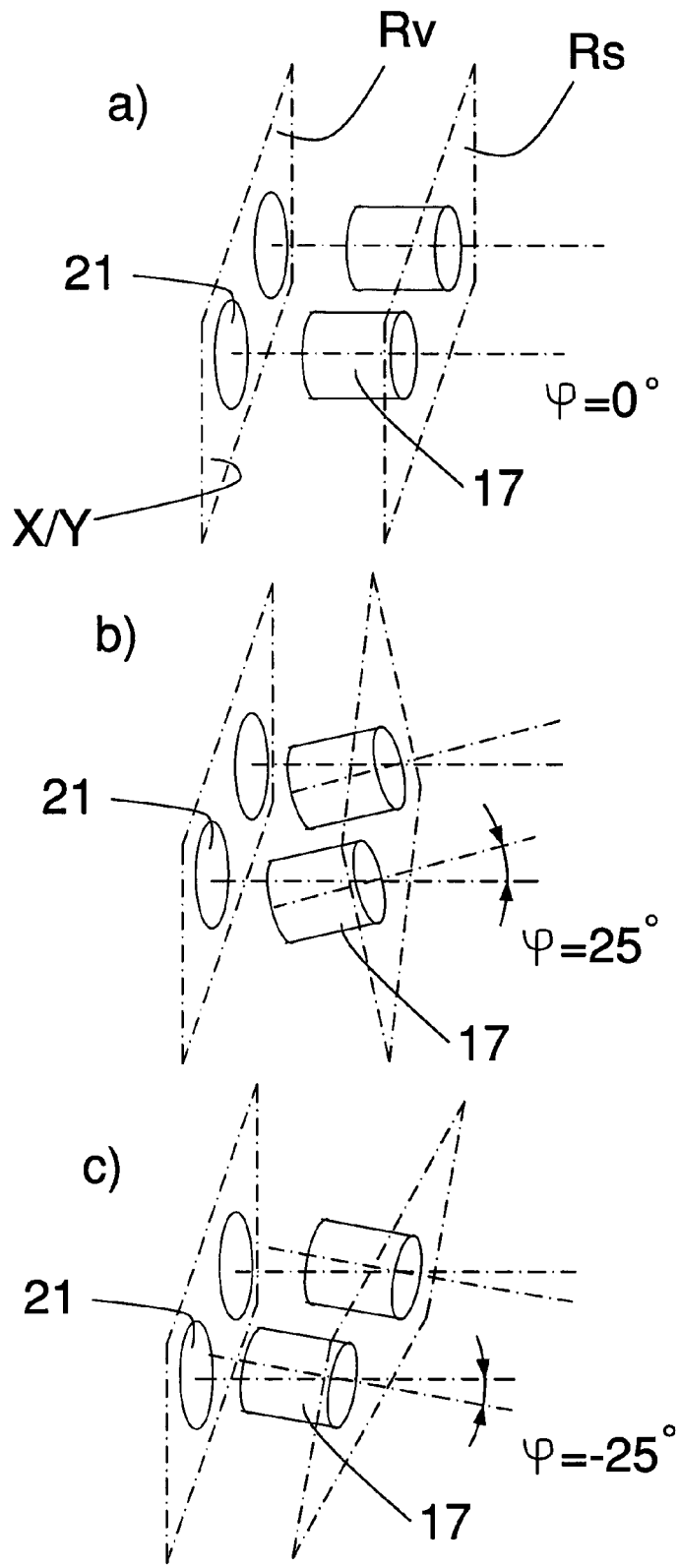

FIG. 7 shows schematically different angular positions that may arise between two mounting holes 21 that are included in the fixed first reference system Rv that is defined by the jacket wall 2 (the X/Y plane) of the grinding drum, and two attachment means 17 (schematic depicted here as cylinders) that are components of the moveable second reference system Rs that is defined by a wear lining element 10 that is being handled by a lifting arrangement 14. The two attachment means 17 of the wear lining element 10 in FIG. 7a are placed with the longitudinal axis perpendicular to the X/Y plane that is defined by the mounting openings 21 of the jacket plate 2. The two attachment means 17 of the wear lining element 10 in FIG. 7b are placed with the longitudinal axis at an angle of 25° to the X/Y plane that is defined by the mounting openings 21 of the jacket plate 2. The two attachment means 17 of the wear lining element 10 in FIG. 7c are placed with the longitudinal axis at an angle of −25° to the X/Y plane.

Figure 8:
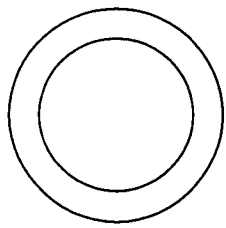
Figure 8:
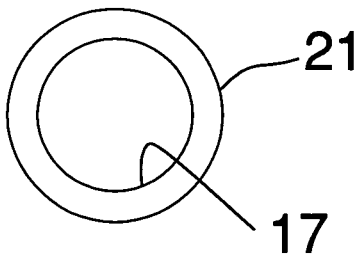
Figure 8:
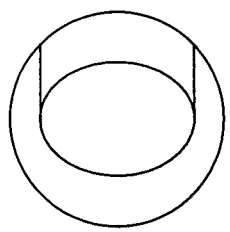
Figure 8:
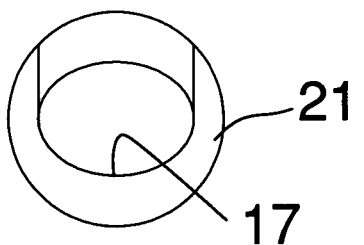
Figure 8:
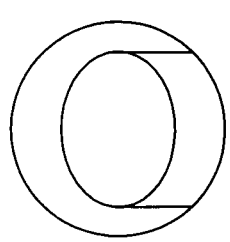
Figure 8:
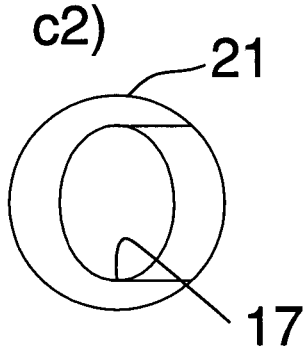
Figure 8:
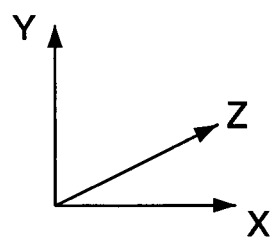

FIG. 8 shows schematically the different angular positions that can arise between the two reference systems Rv, Rs that are also illustrated in FIGS. 7a-7c, but in this case shown based on the field of view of the two-dimensional sensor 31, 31'. Thus, in FIGS. 8a-8c there are illustrated the ways in which the two image recording cameras 31, 31' view the attachment means 17 of the wear lining element 10 through the mounting holes 21 and the geometrical images that are presented in the form of a two-dimensional image 44a, 44b to the crane operator on the display unit 44 or monitor at the operating place of the lifting arrangement 14 (see also FIG. 5). The images from each of the cameras 31, 31' are denoted by a1-c1 and a2-c2, respectively. In a similar way to that described above, FIG. 8a shows a condition in which the two attachment means 17 of the wear lining element 10 are located with the longitudinal axis perpendicular to the X/Y plane that is defined by the mounting openings 21 of the jacket plate 2. The two attachment means 17 of the wear lining element 10 in FIG. 8b are placed with the longitudinal axis at an angle of 25° to the X/Y plane that is defined by the mounting openings 21 of the jacket plate 2. The two attachment means 17 of the wear lining element 10 in FIG. 8c are placed with the longitudinal axis at an angle of −25° to the X/Y plane.

As has been described above, the wear lining element 10 can be displaced with the aid of the lifting arrangement 14 essentially freely in space or in at least two or three degrees of translational freedom in space, i.e. in the x-, y- and z-directions, and with the aid of a number of rotational degrees of freedom also its attitude can normally be controlled, for example the roll, pitch and yaw angles. Under guidance of an image sequence from the display unit 44, i.e. the monitor that the crane operator 5 has at the operating place, the operator can guide and manoeuvre the wear lining element to its location, after which it is lowered and fixed in place from the outer surface of the drum, i.e. from the mounting side.

FIG. 9 shows a system that allows remote control of the control and positioning system that has been described above and that makes it possible for an experienced and skilled crane operator 5 to work using remote control in a system in which data is transferred over, for example, the internet or a WLAN. In this way it would be possible for the renovation and lining of grinders to be carried out without qualified personnel needing to be at the site, whereby an experienced crane operator would be able with the aid of the present control and positioning system to remotely control externally one or several lifting arrangements or manipulators inside different grinders at different places in the world. A system that allows this comprises a lifting arrangement 14 that is equipped with a control unit 14b, i.e. a control valve unit that allows remote control through a control unit 20b comprising guidance and control levers. Hydraulic systems that allow remote control normally include transmitters and receivers where control signals in the form of infrared radiation are transmitted as electrical control commands to a control in the control unit 14*b* of the machine and have been well known for a long time, and will therefore not be described in more detail. The present system comprises furthermore an image processing unit 42 intended to receive images from the first and second cameras 31, 31', a wireless communication module 108, a wireless IP-sharing arrangement 60 (where "IP" is an abbreviation for "internet protocol"), and a distant workplace for an operator comprising a computer terminal 120 that is connected to the internet 100 and to which has been assigned a control unit 20*b* comprising a control stick (joystick) for the manoeuvring of the crane arrangement 14. Image signals taken by the two cameras 31, 31' are sent to the image processing unit 42 and after processing in this unit are sent as an image signal through the wireless communication module 108 and the wireless IP-sharing unit 60. The wireless communication module receives also control signals from the computer terminal 120 and the control system 20*b* for the control unit 14*b* and thus the commands for the manoeuvring and guidance of the lifting arrangement 14. Two-way data communication thus takes place over the internet 100. The wireless communication module 108 may be a wireless USB-adapter or a wireless LAN card that is compatible for use with the wireless IP-sharing arrangement 60. Control signals for the control unit 14*s* are given by keyboard commands 120 at the computer terminal in combination with joystick commands through the control stick 20*b*, whereby these commands are received by the IP-sharing module 60 to be passed on to the system control 14*a* through the communication module 108. The wireless IP-sharing arrangement 60 is thus connected to the internet line 120 not only to feed out image data from the cameras 31, 31', but also to pass control signals in to the control and actuator means 14*a* of the lifting arrangement 14. A crane operator 5 who sits in front of the computer terminal 120, 20, while being geographically remote from the site, for example the grinder 1, thus can control all motion of the lifting arrangement 14 by means of the control stick 20*b* with the aid of the geometrical images between these two that are displayed on the monitor 44 from each one of the two image recording cameras 31, 31' and the two reference systems Rv and Rs.

The invention is not limited to what has been described above and shown in the drawings: it can be changed and modified in several different ways within the scope of the innovative concept defined by the attached patent claims.

The invention claimed is:

1. A control and positioning system for the indication of the mounting condition of an exchangeable wear lining element at a surface at a wall that is subject to wear, which is constituted by the inner surface of a rotating drum at an ore grinder, and where the wear lining element is supported at the free end of a manoeuvrable arm that is a component of a lifting arrangement that is controlled during the handling of the wear lining element during a mounting operation by a crane operator, whereby the wall is provided with a set of mounting holes and the wear lining element is equipped on its lower surface with attachment means, whereby the wear lining element is intended to be tightened against the surface by means of supplementary attachment means that are introduced through the mounting holes, wherein the system comprises:

a first reference system formed by the mounting holes of the wall;

a second reference system formed by the attachment means located on the lower surface of the wear lining element;

a two-dimensional sensor that is arranged to be stationary at the outer surface of the wall which is located on the opposite side of the wall of the mounting surface to that which is exposed to wear, in such a manner that the field of view of the sensor contains the lower surface of the wear lining element viewed through the mounting holes, whereby the sensor is arranged to transmit an electrical signal that represents an image of the relative position between the first and second reference systems, and with the guidance of which image the mounting position of the wear lining element at the wall can be determined by the crane operator.

2. The control and positioning system according to claim 1, whereby the two-dimensional sensor comprises two image recording cameras that are secured to the first reference system in such a manner that their fields of view contain the attachment means located at the lower surface of the wear lining element viewed through the mounting holes.

3. The control and positioning system according to claim 2, further comprising an image processing unit that converts the electrical signal from the image recording cameras to a graphic two-dimensional image and a display unit with which the image can be presented in real time for the crane operator so that the crane operator can guide and maneuver the lifting arrangement and in this way bring the wear lining element into its mounting position at the wall.

4. The control and positioning system according to claim 1, comprising a source of illumination that is arranged to emit light from the outer surface of the wall through the mounting holes or openings of the wall in a direction towards the lower surface of the wear lining element.

5. The control and positioning system according to claim 1, whereby the two-dimensional sensor comprises a ring-shaped guide intended to be introduced as a probe into the mounting holes of the wall for geometric determination of the geometric position of the first reference system.

6. The control and positioning system according to claim 5, further comprising a housing in which an image recording camera and a source of illumination are positioned, and which housing is equipped at a forward end with the ring-shaped guide and an attachment means that allows the housing to be mounted at the outer surface of the wall in association with a mounting hole, in a manner that allows it to be removed.

7. The control and positioning system according to claim 6, whereby the attachment means comprises a magnetic attachment.

8. The control and positioning system according to claim 2, whereby each image recording camera comprises a lens at which the source of illumination is arranged as a set of LEDs, distributed around the circumference of the lens.

9. The control and positioning system according to claim 1, further comprising a lifting arrangement of the type that demonstrates a control unit provided with a transmitter and receiver in order to allow remote control of the control and actuator means of the lifting arrangement and where control signals are sent as electrical control commands to a control in the control unit of the arrangement, an external communication unit that offers a two-way communication connection over the internet with a control unit and the image processing unit and with which the crane operator located at a distance can in real time guide and control the relative positions of the reference systems.

10. The control and positioning system according to claim 9, whereby the external communication unit comprises a computer terminal with an associated control stick.

\* \* \* \* \*